Aug. 19, 1924.                            1,505,885
G. HAINLEN
BUMPER
Filed Feb. 27, 1924
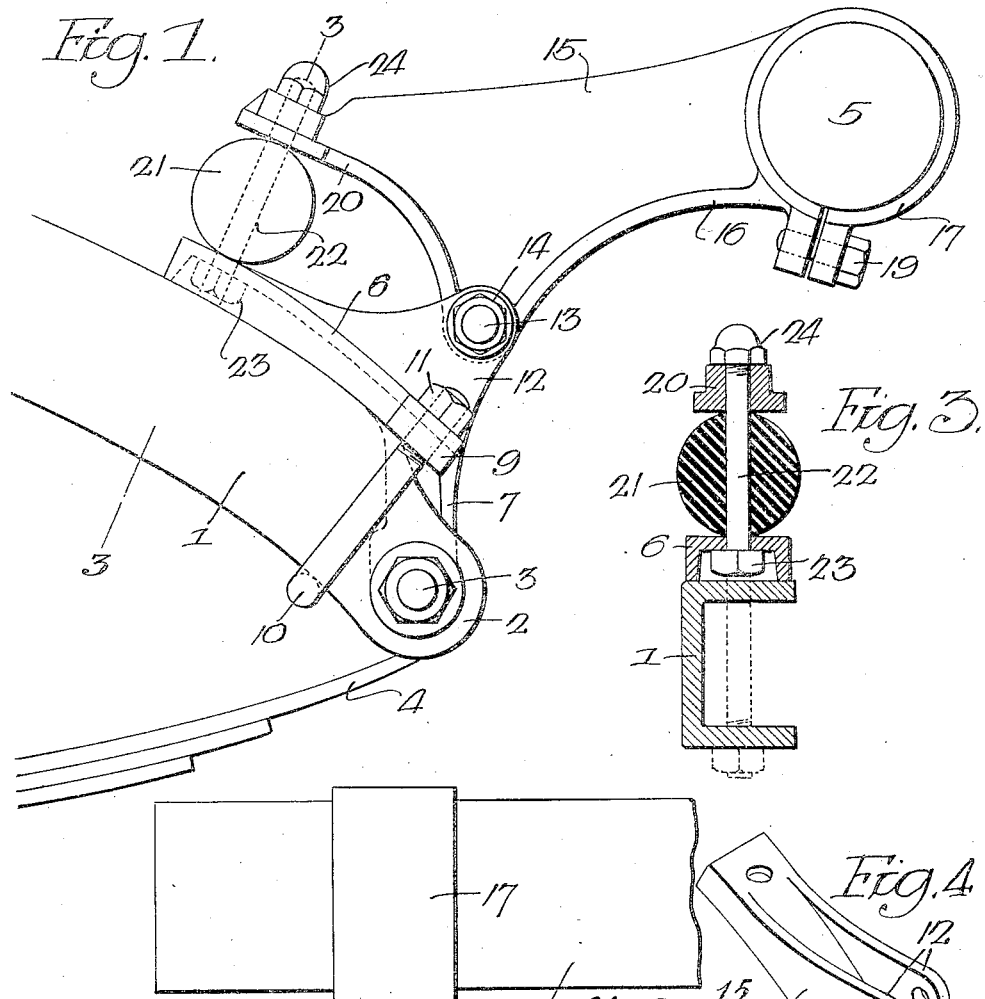
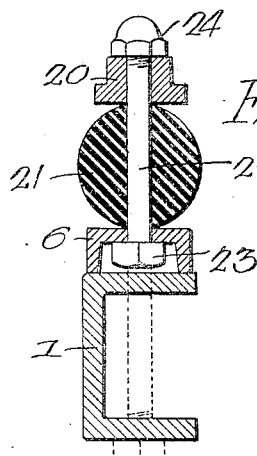
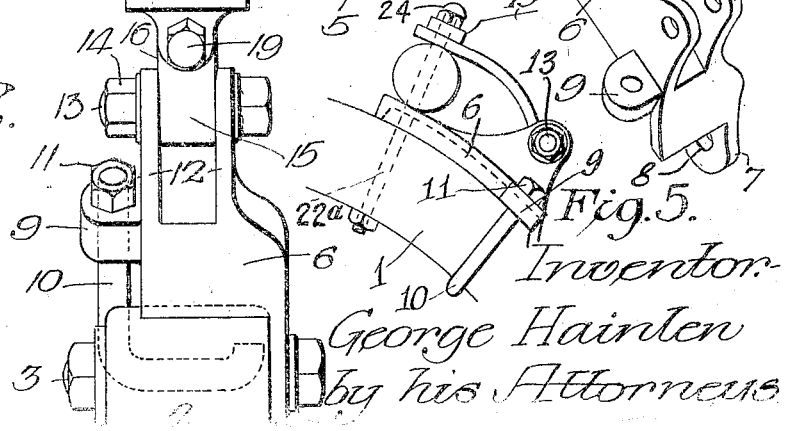
Inventor:
George Hainlen
by his Attorneys Patented Aug. 19, 1924.

1,505,885

UNITED STATES PATENT OFFICE.

GEORGE HAINLEN, OF PHILADELPHIA, PENNSYLVANIA.

BUMPER.

Application filed February 27, 1924. Serial No. 695,543.

*To all whom it may concern:*

Be it known that I, GEORGE HAINLEN, a citizen of the United States, residing in Philadelphia, Pennsylvania, have invented certain Improvements in Bumpers, of which the following is a specification.

My invention relates to certain improvements in bumpers for vehicles, especially those located at the front, or rear, of an automobile.

The object of my invention is to construct the bumper so that it can be readily applied to the frame of an automobile in such a manner that it will yield when struck, the support resisting the strain to which it is subjected.

In the accompanying drawings:

Fig. 1 is a side view of my improved bumper secured to the front frame of an automobile;

Fig. 2 is a front view of one end of the bumper;

Fig. 3 is a sectional view on the line 3—3, Fig. 1;

Fig. 4 is a detached perspective view of the bearing plate that is secured to the automobile frame, and Fig. 5 is a view of a modification.

Referring to the drawings, 1 is one of the side frames of an automobile made in the form of a channel, having a solid end 2 in which is the opening for the passage of the bolt 3, which secures the front spring 4 to the frame. The bolt 3 may be made in any suitable manner and is usually supplied with a passage for lubricant. The two side frames are spaced apart and the bumper bar 5 extends across the front of the frame and is supported at each side frame by my improved structure.

6 designates a bearing plate, which is hollow on the under side to form flanges that rest upon the frame. At one side of the plate 6 is a depending arm 7, preferably integral with the plate. This arm has an opening 8 for the passage of the spring bolt 3—taking the place of the usual washer. On the opposite side of the plate 6 is a projecting lug 9, which has an opening therein for the passage of a hooked bolt 10 that passes under the frame. On the bolt 10 is a nut 11. On turning the nut, the bolt is drawn tightly against the frame, drawing the bearing plate 6 to its seat on the frame. This construction makes a rigid fastening without perforating the frame at the end.

Projecting from the upper surface of the bearing plate are two bearings 12, perforated for the passage of a pivot bolt 13, having a nut 14. Mounted on the bolt 13 is a two-armed lever bracket 15. One arm 16 of the bracket has a clamp ring 17, which encircles the bumper bar 5. The ring is split, as shown in Fig. 1, and has lugs through which a clamp screw 19 extends, which draws the ring tightly upon the bumper bar to hold it against longitudinal movement. The other arm 20 of the bracket 15 is shaped to provide a space for the yielding member 21, which, in the present instance, is a solid rubber ball. In some cases, however, a metallic spring may be substituted for the ball. The end of the arm 20 is perforated for the passage of a bolt 22, which extends through the ball and through a perforation in the bearing plate.

The head 23 of the bolt 22 is located in the cavity in the bearing plate between the plate and the frame. A nut 24 is secured to the opposite end of the bolt and rests upon the arm of the bracket. This construction avoids drilling the frame. The bolt 22$^a$ may extend through the flanges of the frame, as shown in Fig. 5, if found desirable.

There are two supports for the bumper bar. One support is mounted in each side frame of the automobile. When the bumper strikes an object, it yields sufficiently to cushion the blow. The brackets turn on their pivots, and the ball 21 is compressed. The arm of the bracket rides on the bolt 22. The spring bolt 3 and the hooked bolt 10 resist the pressure and hold the bearing plate firmly to its seat.

The improved bumper is neat in appearance and can be readily applied to the frame of an automobile without drilling the frame for the securing means.

I claim:

1. The combination in a bumper, of a bearing plate having an extension on one side perforated for the passage of a spring bolt and having a bearing on its upper surface; a two-armed bracket pivotally mounted on the bearing; a bumper bar carried by one arm, the other arm extending beyond the pivot; and a yielding member located between the rear arm of the bracket and the bearing plate.

2. The combination in a bumper, of a bearing plate having an extension on one side for the passage of a spring bolt and having a perforated lug on the opposite side; a bolt extending through the perforation and engaging the frame of a vehicle, said plate having a bearing; a two-armed bracket pivotally mounted on the bearing; and a bumper carried by the rear arm of the bracket and the bearing plate.

3. The combination in a bumper, of a frame of a vehicle; a spring bolt therein; a bearing plate mounted on the frame and having a perforated extension for the spring bolt; a hooked bolt clamping the plate to the frame; bearings on the plate; a pivot pin mounted in the bearings; a two-armed bracket mounted on the pivot pin; a bumper bar carried by one arm of the bracket; a yielding member mounted between the other arm of the bracket and the plate; and a bolt extending through the plate, the yielding member, and the arm.

4. The combination of a frame of a vehicle; a spring; a bolt securing the spring to the frame; a bearing plate mounted on the upper surface of the frame at the end thereof, said plate having an integral extension on one side perforated for the passage of the spring bolt; a perforated lug on the opposite side of the frame near its outer end; a hooked bolt extending through the lug and arranged to engage the frame; bearings on the frame; a pivot mounted in the bearings; a two-armed bracket mounted on the pivot; a bumper bar carried by the forward arm of the bracket; a yielding member mounted between the rear arm of the bracket and the plate; a bolt extending through the plate, the yielding member and the arm, the head of the bolt being located between the place and the frame; and a nut on the opposite end of the bolt.

GEORGE HAINLEN.